United States Patent
Winslow et al.

(10) Patent No.: US 6,995,216 B2
(45) Date of Patent: Feb. 7, 2006

(54) PROCESS FOR MANUFACTURING SINGLE-SITE POLYOLEFINS

(75) Inventors: Linda N. Winslow, Cincinnati, OH (US); Sandor Nagy, Naperville, IL (US)

(73) Assignee: Equistar Chemicals, LP, Houston, TX (US)

( * ) Notice: Subject to any disclaimer, the term of this patent is extended or adjusted under 35 U.S.C. 154(b) by 153 days.

(21) Appl. No.: 10/462,493

(22) Filed: Jun. 16, 2003

(65) Prior Publication Data

US 2004/0254310 A1    Dec. 16, 2004

(51) Int. Cl.
C08F 2/00     (2006.01)
C08F 4/76     (2006.01)
C08F 4/52     (2006.01)

(52) U.S. Cl. ............................ 526/66; 526/78; 526/79; 526/905; 526/161; 526/172; 526/943; 526/126; 526/134; 526/348.5; 526/348.6

(58) Field of Classification Search ................ 526/172, 526/65, 79, 131–134, 943, 905, 160–161, 526/66
See application file for complete search history.

(56) References Cited

U.S. PATENT DOCUMENTS

| 5,371,053 A | 12/1994 | Agapiou et al. ............... 502/56 |
| 5,442,019 A | 8/1995 | Agapiou et al. ............... 526/82 |
| 5,539,124 A | 7/1996 | Etherton et al. ............. 548/402 |
| 5,554,775 A | 9/1996 | Krishnamurti et al. ......... 556/7 |
| 5,637,660 A | 6/1997 | Nagy et al. .................. 526/160 |
| 5,747,594 A | 5/1998 | deGroot et al. ............. 525/240 |
| 5,902,866 A | 5/1999 | Nagy et al. .................. 526/133 |
| 6,127,484 A | 10/2000 | Cribbs et al. ................ 525/191 |
| 6,211,311 B1 | 4/2001 | Wang et al. ................. 526/131 |
| 6,232,260 B1 | 5/2001 | Nagy et al. .................. 502/155 |
| 6,372,864 B1 | 4/2002 | Brown ........................ 526/65 |
| 6,756,455 B2 * | 6/2004 | Nagy et al. .................. 526/161 |

FOREIGN PATENT DOCUMENTS

| EP | 0 881 237 A1 | 5/1997 |
| WO | WO 99/24446 | 5/1999 |
| WO | WO 03/008496 | 1/2003 |

OTHER PUBLICATIONS

Buu-Hoï and Xuong, "Carcinogenic Nitrogen Compounds. Part XI," J. Chem. Soc., 1952, p. 2225.

* cited by examiner

Primary Examiner—David W. Wu
Assistant Examiner—Rip A. Lee
(74) Attorney, Agent, or Firm—Shao-Hua Guo

(57) ABSTRACT

A dual olefin polymerization process is disclosed. The process uses a bridged indenoindolyl ligand-containing Group 4 transition metal complex and an activator. It is carried out in multiple stages or in multiple reactors. The same complex and the same activator are used in all stages or reactors. Different polyolefins are made in different stages or reactors by varying the monomer compositions, hydrogen concentrations, or both. The process of the invention produces polyolefins which have broad molecular weight distributions, composition distributions, or both.

38 Claims, No Drawings

PROCESS FOR MANUFACTURING SINGLE-SITE POLYOLEFINS

FIELD OF THE INVENTION

The invention relates to a process for producing single-site polyolefins. More particularly, the invention relates to a dual process which uses the same single-site catalyst and the same activator in different polymerization stages or reactors.

BACKGROUND OF THE INVENTION

Single-site polyolefins have narrow molecular weight distribution and uniform composition distribution (i.e., the comonomer recurring units are uniformly distributed along the polymer chains). The combination of narrow molecular weight distribution and uniform composition distribution distinguishes single-site polyolefins from conventional polyolefins made by Ziegler or chromium catalysts. Compared to Ziegler polyolefins, single-site polyolefins have improved impact resistance, tensile strength, and optical properties.

However, the uniformity of molecular weight distribution causes reduced thermal processability of single-site polyolefins. It is difficult to process single-site polyolefins under the conditions normally used for Ziegler polyolefins. The reduced processability limits the development of single-site polyolefins because the alteration of the process conditions requires a large capital investment. Accordingly, it would be highly desirable to prepare polyolefins which possess the improved physical properties offered by single site catalysts and also exhibit processability characteristics which are similar to those of conventional polyolefins.

One approach to achieve this object is using mixed catalyst systems. For instance, U.S. Pat. No. 5,747,594 teaches a two-stage polymerization process. In a first stage, ethylene and a higher α-olefin are polymerized with a single-site catalyst. The polymerization continues in a second stage where a Ziegler catalyst is used. Therefore, the product is a mixture of single-site polyolefin and Ziegler polyolefin. The disparity of the two polymers in molecular weight and composition gives the product an improved thermal processability. Also, U.S. Pat. No. 6,127,484 teaches a multiple reaction zone process that uses a single-site catalyst in a first reaction zone and a Ziegler catalyst in a later reaction zone.

Another alternative is using a single-site catalyst in two different polymerization reactors which are operated with different activators. For instance, an alumoxane is used in one reactor and an ionic activator is used in the other. The use of different activators result in polyolefin made in the different reactors having different molecular weights and thus the combined polyolefin has a broad molecular weight distribution and improved processability. See U.S. Pat. No. 6,372,864.

However, the use of mixed catalysts or activators is generally associated with operability problems. The two different catalysts or activators may interfere with one another, for example, the organoaluminum compounds which are often used in Ziegler catalyst poison single-site catalysts. Therefore, catalyst deactivation is often involved when two incompatible catalyst systems are used. Catalyst deactivation is costly and complicated. See U.S. Pat. Nos. 5,371,053 and 5,442,019.

In sum, dual process for producing single-site polyolefin is needed. Ideally, the dual process would produce polyolefins that have different molecular weights or different compositions in different stages or reactors. Ideally, the dual process would use the same single-site catalyst and the same activator in all stages or reactors.

SUMMARY OF THE INVENTION

The invention is a dual olefin polymerization process. The process uses a bridged indenoindolyl ligand-containing Group 4 transition metal complex and an activator. The process is carried out in multiple stages or in multiple reactors. The same complex and the same activator are used in all stages or reactors. Different polyolefins are made in different stages or reactors by varying the monomer compositions, hydrogen concentrations, or both. Thus, the process of the invention produces polyolefins which have broad molecular weight, composition distributions, or both.

We have found that bridged indenoindolyl ligand-containing single-site catalysts have a great capability to incorporate a high concentration of higher α-olefins into polyethylene without sacrificing its molecular weight. This characteristic is similar to that of the conventional Ziegler catalysts and makes the bridged indenoindolyl ligand-containing single catalysts desirable for the use in the dual process. The process of the invention eliminates the need for mixed catalysts or mixed activators which are required in the known dual olefin polymerization processes.

DETAILED DESCRIPTION OF THE INVENTION

The process of the invention uses a bridged indenoindolyl ligand-containing Group 4 transition metal complex. The complex preferably has the general structure of

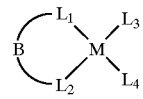

M is a Group 4 transition metal; B is a bridging group; $L_1$ is an indenoindolyl ligand; $L_2$ is a ligand selected from the group consisting of cyclopentadienyls, indenyls, fluorenyls, boraarys, pyrrolyls, azaborolinyls, quinolinyls, indenoindolyls, and phosphinimines; L3 and L4, the same or different, are independently selected from the group consisting of hydrogen, halogens, alkyls, aryls, alkoxys, aryloxys, siloxys, alkyl aminos, and aryl aminos.

Preferred Group 4 transition metals are zirconium and titanium. Zirconium is particularly preferred. Indenoindolyl ligands can be generated by deprotonating an indenoindole compound using a potent base. By "indenoindole compound," we mean an organic compound that has both indole and indene rings. The five-membered rings from each are fused, i.e., they share two carbon atoms. Preferably, the rings are fused such that the indole nitrogen and the only $sp^3$-hybridized carbon on the indenyl ring are "trans" to each other. Such is the case in an indeno[1,2-b] ring system:

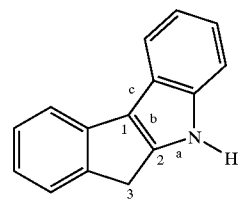

Suitable ring systems also include those in which the indole nitrogen and the $sp^3$-hybridized carbon of the indene are beta to each other, i.e., they are on the same side of the molecule. This is an indeno[2,1-b]indole ring system:

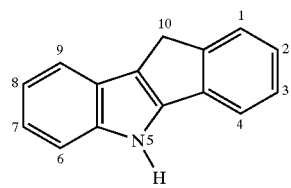

The ring atoms can be substituted. Suitable $L_1$ includes those represented by

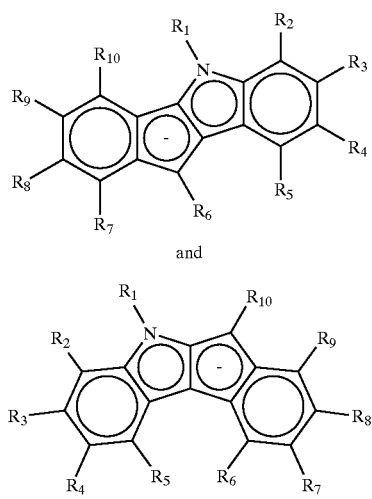

and wherein $R_1$ is selected from the group consisting of alkyl, aryl, aralkyl, and silyl groups; $R_2$ through $R_{10}$ are the same or different and selected from the group consisting of hydrogen, alkyl, aryl, aralkyl, alkylaryl, silyl, halogen, alkoxy, aryloxy, siloxy, nitro, dialkyl amino, and diaryl amino groups.

Methods for making indenoindole compounds are known. Suitable methods and compounds are disclosed, for example, in U.S. Pat. No. 6,232,260, the teachings of which are incorporated herein by reference, and references cited therein, including the method of Buu-Hoi and Xuong, *J. Chem. Soc.* (1952) 2225. Suitable procedures also appear in PCT Int. Appl. WO 99/24446.

The indenoindolyl ligand is bridged to another ligand, and both moieties coordinate to the transition metal. Preferably, the other ligand is a second indenoindolyl ligand or a ligand selected from the group consisting of, substituted and unsubstituted, cyclopentadienyl, fluorenyl, and indenyl ligands. Suitable other ligands also include heteroatomic ligands such as boraaryl, pyrrolyl, indolyl, quinolinoxy, pyridinoxy, and azaborolinyl. These ligands are described in U.S. Pat. Nos. 5,554,775, 5,539,124, 5,637,660, and 5,902,866; the teachings of these patents are incorporated herein by reference.

Bridging group, B, covalently connects the indenoindolyl ligand and the other ligand. Suitable bridging groups include $CR_2$, $C_2R_4$, $SiR_2$, $Si_2R_4$, $GeR_2$, $Ge_2R_4$, $R_2SiCR_2$, NR, and PR. Preferably, B is selected from the group consisting of dialkylsilyl, diarylsilyl, tetraalkyldisilyl, ethylidene, isopropylidene, methylene, dimethylene, 1,2-diphenylene, 1,4-diphenylene, and the like. Particularly preferred are methylene, dimethylene, isopropylidene, and dimethylsilyl.

$L_3$ and $L_4$, the same or different, are preferably selected from the group consisting of hydrogen, halogens, alkyls, aryls, alkoxys, aryloxys, siloxys, alkyl aminos, aryl aminos, and the like. Preferably, at least one of $L_3$ and $L_4$ is halogen. More preferably, both $L_3$ and $L_4$ are halogen. Most preferably, both $L_3$ and $L_4$ are chlorine. Halogen ligands are easy to be activated.

Examples of suitable complexes include $Me_2Si(indeno[1,2-b]indolyl)(Cp)ZrCl_2$, $Me_2Si(indeno[1,2-b]indolyl)_2ZrCl_2$, $Me_2Si(indeno[2,1-b]indolyl)(Cp)ZrCl_2$, $Me_2Si(indeno[2,1-b]indolyl)_2ZrCl_2$, $Me_2C(indeno[1,2-b]indolyl)(Cp)ZrCl_2$, $Me_2C(indeno[1,2-b]indolyl)_2ZrCl_2$, $Me_2C(indeno[2,1-b]indolyl)(Cp)ZrCl_2$, $Me_2C(indeno[2,1-b]indolyl)_2ZrCl_2$, $Ph_2C(indeno[1,2-b]indolyl)(Cp)ZrCl_2$, $Ph_2C(indeno[1,2-b]indolyl)_2ZrCl_2$, $Ph_2C(indeno[2,1-b]indolyl)(Cp)ZrCl_2$, $Ph_2C(indeno[2,1-b]indolyl)_2ZrCl_2$, $Me_2Si(indeno[1,2-b]indolyl)(Flu)ZrCl_2$, $Me_2Si(indeno[2,1-b]indolyl)(Flu)ZrCl_2$, $Me_2C(indeno[1,2-b]indolyl)(Flu)ZrCl_2$, $Me_2C(indeno[2,1-b]indolyl)(Flu)ZrCl_2$, $Ph_2C(indeno[1,2-b]indolyl)(Flu)ZrCl_2$, $Ph_2C(indeno[2,1-b]indolyl)(Flu)ZrCl_2$, $(CH_2-CH_2)(indeno[1,2-b]indolyl)(Cp)ZrCl_2$, $(CH_2-CH_2)(indeno[1,2-b]indolyl)_2ZrCl_2$, $(CH_2-CH_2)(indeno[2,1-b]indolyl)(Cp)ZrCl_2$, $(CH_2-CH_2)(indeno[2,1-b]indolyl)_2ZrCl_2$, $((CH_3)_2Si-Si(CH_3)_2))(indeno[1,2-b]indolyl)(Cp)ZrCl_2$, $((CH_3)_2Si-Si(CH_3)_2))(indeno[1,2-b]indolyl)_2ZrCl_2$, $((CH_3)_2Si-Si(CH_3)_2))(indeno[2,1-b]indolyl)(Cp)ZrCl_2$, $((CH_3)_2Si-Si(CH_3)_2))(indeno[2,1-b]indolyl)_2ZrCl_2$, the like, and mixtures thereof. Methods for making the complexes are known. For instance, co-pending application Ser. No. 10/123,774, which is incorporated herein by reference, teaches a typical scheme of the syntheses.

Optionally, the complex is immobilized on a support. The support is preferably a porous material such as inorganic oxides and chlorides, and organic polymer resins. Preferred inorganic oxides include oxides of Group 2, 3, 4, 5, 13, or 14 elements. Preferred supports include silica, alumina, silica-aluminas, magnesias, titanias, zirconias, magnesium chloride, and crosslinked polystyrene. Silica is most preferred.

Preferably, the support has a surface area in the range of about 2 to about 700 m$^2$/g, preferably about 5 to about 10 m$^2$/g, a pore volume in the range of about 0.1 to about 4.0 mL/g, an average particle size in the range of about 10 to about 500 $\mu$m, and an average pore diameter in the range of about 10 to about 1000 Å. They are preferably modified by heat treatment, chemical modification, or both. For heat treatment, the support is preferably heated at a temperature from about 50° C. to about 800° C. More preferably, the temperature is from about 50° C. to about 300° C.

Suitable chemical modifiers include organoaluminum, organosilicon, organomagnesium, and organoboron compounds. Organosilicon and organoboron compounds, such as hexamethyl-disilazane and triethylborane, are preferred. Suitable techniques to support a single-site catalyst are known. For instance, U.S. Pat. No. 6,211,311, which is incorporated herein by reference, discusses supporting heteroatomic ligand-containing single-site catalysts. Supported complexes are suitable for gas phase and slurry polymerization.

The complex is used with an activator. Suitable activators include alumoxanes, alkyl aluminums, alkyl aluminum halides, anionic compounds of boron or aluminum, trialkylboron and triarylboron compounds. Examples include methyl alumoxane (MAO), polymeric MAO (PMAO), ethyl alumoxane, diisobutyl alumoxane, triethylaluminum, diethyl aluminum chloride, trimethylaluminum, triisobutyl aluminum, lithiumtetrakis(pentafluorophenyl) borate, lithium tetrakis(pentafluoro-phenyl)aluminate, dimethylanilinium tetrakis (pentafluorophenyl)borate, trityl tetrakis (pentafluorophenyl)borate, tris(pentafluorophenyl)borane, triphenylborane, tri-n-octylborane, the like, and mixtures thereof. MAO, PMAO, and tris-(pentafluorophenyl)borane are preferred.

Activators can be combined with the complex and the mixture is then immobilized on a support. Alternatively, the complex and the activator can be added separately to the polymerization reactor. Activators are generally used in an amount within the range of about 0.01 to about 100,000, preferably from about 0.1 to about 1,000, and most preferably from about 0.5 to about 300, moles per mole of the complex.

Suitable α-olefins include $C_{2-10}$ α-olefins. Examples are ethylene, propylene, 1-butene, 1-pentene, 1-hexene, 1-octene, 4-methyl-1-pentene, and mixtures thereof. When a single α-olefin is used, a homopolymer is produced. Particularly interesting homopolymers that can be made by the process of the invention include polyethylene and polypropylene. When two or more olefins are use, a copolymer is produced. Particularly interesting copolymers include copolymers of ethylene with 1-butene, 1-pentene, 1-hexene, or 1-octene.

The process is carried out either in multiple stages or in multiple reactors. "Multiple stages" means that two or more stages are involved in a single reactor. The reactor can be a stirred tank or tube reactor. "Multiple reactors" means that two or more reactors are used. The reactors can be either set up sequentially or parallel. Different polymers are made in different stages or reactors. Therefore, the combined polyolefin has broad molecular weight distribution, composition distribution, or both. Such polyolefins overcomes the difficulty of the conversional single-site polyolefins in thermal processing such as extrusion and injection.

For instance, the process can be carried out in two sequential stages. By varying the hydrogen concentration and the ethylene/longer chain α-olefin ratio in each stage, polyethylenes of different densities and/or molecular weights can be produced in different stages. For example, a high density polyethylene (HDPE) can be made in a first stage by using ethylene only or a mixture of ethylene with a higher α-olefin which has a weight ratio of ethylene/higher α-olefin greater than 95/5. In a second stage, a linear low density polyethylene (LLDPE) can be made by using a monomer mixture that has a molar ratio of ethylene/higher α-olefin less than 95/5. Similarly, a high hydrogen concentration can be used in the first stage to reduce the molecular weight of the HDPE and a low hydrogen concentration used in the second stage so that the LLDPE produced has a relatively high molecular weight. Thus, the polyethylene produced by the process combines the HDPE of the first stage and the LLDPE of the second stage.

HDPE and LLDPE are defined by ASTM D4976-98: Standard Specification for Polyethylene Plastic Molding and Extrusion Materials. HDPE has a density 0.941 g/cc or greater and LDPE has a density from 0.910 to 0.925 g/cc. The product of the process can be HDPE, LLDPE, or medium density polyethylene (MDPE, density from 0.926 to 0.940 g/cc) depending on the relative amount of the polymers made in each stage or reactor. Preferably, from about 30% to about 70% of the product is made in the first stage. Polymers of the first stage and the second stage are mixed by any convenient ways. They can be mixed in a mixing tank or in an extruder.

A hydrogen/ethylene molar ratio within the range of about 0.001/1 to about 10/1 is preferably used in the first stage. Preferably, a hydrogen/ethylene molar ratio is less than 1/1 in the second stage.

Multi-reactor processes differ from multi-stage processes in that in multi-reactor processes, each stage of the polymerization is carried out in a separate reactor. For instance, when two sequential reactors are used, an HDPE can be made in the first reactor. The product is then transferred to the second reactor where an LLDPE can be made. Alternatively, two reactors can be parallel in which a different polymer is made in each reactor. The two polymers are then mixed. Conditions for multi-reactor processes are similar to the multi-stage processes discussed above.

The following examples merely illustrate the invention. Those skilled in the art will recognize many variations that are within the spirit of the invention and scope of the claims.

EXAMPLE 1

Preparation of a Dimethylsilyl-Bridged Indeno[1,2-b]indolyl Cyclopentadienyl Zirconium Complex (a) Preparation of Indeno[1,2-b]indole A mixture of 1-indanone (30.6 g, 232 mmol) and p-tolylhydrazine hydrochloride (37.0 g, 233 mmol) in EtOH (350 mL) and aqueous HCl (12 N, 18 mL) are heated to reflux for 90 min. The mixture is cooled and filtered, and the solid is washed with EtOH (600 mL) followed by 20% aqueous EtOH (400 mL) and finally hexanes (200 mL). The off-white solid is dried under vacuum (36.5 g, 72%).

(b) N-Methylation

A mixture of product (a) (36.5 g, 166 mmol), aqueous NaOH solution (112 mL, 20 M, 2.2 mol), $C_{16}H_{33}NMe_3Br$ (0.65 g, 1.78 mmol), and toluene (112 mL) is vigorously stirred at room temperature. A solution of MeI (17.0 mL, 273 mmol) in toluene (15 mL) is added dropwise, and the mixture is stirred at room temperature for 4 h and refluxed for 3 h. A crystalline solid forms upon cooling and is filtered and washed with cold (−78° C.) EtOH (300 mL) followed by hexanes (100 mL). The layers are separated and the aqueous fraction is washed with toluene (2×100 mL). The organics are combined and dried over $Na_2SO_4$ and filtered. The volatiles are removed under vacuum and the precipitate is dried and combined with the crystalline product 2 (total yield 25.7 g, 66%).

(c) Anion Generation n-Butyllithium (n-BuLi) (120 mL, 2.5 M, 1.6 mol) is added dropwise to a solution of product (b) (43.9 g, 188 mmol) in toluene (560 mL). A precipitate forms after an hour. The mixture is allowed to stand for 48 h and is filtered. The solid is washed with toluene (500 mL), then hexanes (500 mL), and is dried under vacuum (40.3 g, 90%).

(d) Reaction with Dichlorodimethylsilane

A solution of product (c) (23.3 g, 97.4 mmol) in toluene (240 mL) and $Et_2O$ (160 mL) is added to a solution of $SiCl_2Me_2$ (60.0 mL, 495 mmol) in $Et_2O$ (170 mL). The mixture becomes cloudy and is stirred for 48 h and filtered over Celite. Volatiles are removed under vacuum to afford a gray solid (24.8 g, 78%).

(e) Dianion Generation

Sodium cyclopenta-dienide (16.0 mL, 2 M, 32.0 mmol) is added to a solution of 4 (9.62 g, 29.5 mmol) in $Et_2O$ (240 mL). A solid forms immediately, and the mixture is maintained at room temperature overnight. The crude mixture is washed with $H_2O$ (100 mL). The organic phase is dried over $Na_2SO_4$ and filtered. Evaporation to dryness gives an oil. The oil is dissolved in $Et_2O$ (250 mL) and cooled to −78° C. n-Butyllithium (28.0 mL, 2.5 M, 70.0 mmol) is added dropwise and the mixture warms slowly to room temperature. Stirring continues for 24 h. A yellow solid forms; the mixture is filtered; and the solid is dried under vacuum (12.3 g, 99%).

(f) Preparation of Zirconium Complex

The dianion of step (e) (7.94 g, 21.6 mmol) is added as a solid to a solution of $ZrCl_4$ (5.03 g, 21.6 mmol) in toluene (250 mL) and $Et_2O$ (50 mL). The mixture turns orange and is maintained at room temperature for 48 h and then filtered. The solid is washed with toluene (200 mL), then hexanes (50 mL), and is dried under vacuum (4.0 g, 36%) to give the complex.

EXAMPLE 2

Preparation of Silica-Supported $Me_2Si$-bridged Indeno[1,2-b]indolyl Cp Complex Silica (Davison 948) is calcined for 4 h at 250° C. Methylalumoxane (1.2 mL of 4.21 M solution of MAO in toluene, product of Albemarle) is added to a 4.0-g sample of the calcined silica, and the mixture is stirred for 10 min. Zirconium complex from Example 1 (40 mg) and tris (pentafluorophenyl)borane ("F15," 99 mg) are dissolved in more of the MAO solution (2.5 mL), and this mixture is added to the pretreated silica. Removal of volatiles gives a green, free-flowing powder having an Al/Zr molar ratio of 233.

EXAMPLE 3

Two-Stage Ethylene Polymerization with Silica-Supported $Me_2Si$-bridged Indeno[1,2-b]indolyl Cp Complex Stage 1: Preparation of High Density Polyethylene A two-liter, stainless-steel reactor is charged with isobutane (900 mL), triisobutylaluminum (0.8 mL of 1.0 M solution in hexane) and hydrogen (measured as a 100-psig pressure drop from a 7-mL vessel). The reactor is pressurized with ethylene to 350 psig, and the contents are heated to 70° C. Silica-supported [1,2-b] complex from Example 2 (0.17 g) is injected into the reactor to start the polymerization. Ethylene is supplied on demand to keep the reactor pressure at 350 psig. After 65 min., the reactor is vented.

Stage 2: Preparation of Linear Low Density Polyethylene

1-Butene (20 mL) is charged to the reaction mixture from stage 1 and the reactor is pressured with fresh ethylene to 350 psig. No fresh hydrogen is added to the reactor. The polymerization continues at 70° C. for 30 min. The reactor is vented and polymer is collected. DSC shows that the polymer product has two distinctive melting points ($T_m$): 134° C. ($T_{m1}$) and 105° C. ($T_{m2}$). $T_{m1}$ and $T_{m2}$ represent HDPE and LLDPE, respectively. The polymer product has Mw: $2.0 \times 10^5$ and Mw/Mn: 3.7.

COMPARATIVE EXAMPLE 4

Preparation of Non-Bridged Indeno[1,2-b]indolyl Cyclopentadienyl Zirconium Complex (a) Preparation of Indeno[1,2-b]indole A mixture of 1-indanone (30.6 g, 232 mmol) and p-tolylhydrazine hydrochloride (37.0 g, 233 mmol) in EtOH (350 mL) and aqueous HCl (12 N, 18 mL) are heated to reflux for 90 min. The mixture is cooled and filtered, and the solid is washed with EtOH (600 mL) followed by 20% aqueous EtOH (400 mL) and finally hexanes (200 mL). The off-white solid is dried under vacuum (36.5 g, 72%).

(b) N-Methylation

A mixture of product (a) (36.5 g, 166 mmol), aqueous NaOH solution (112 mL, 20 M, 2.2 mol), $C_{16}H_{33}NMe_3Br$ (0.65 g, 1.78 mmol), and toluene (112 mL) is vigorously stirred at room temperature. A solution of MeI (17.0 mL, 273 mmol) in toluene (15 mL) is added dropwise, and the mixture is stirred at room temperature for 4 h and refluxed for 3 h. A crystalline solid forms upon cooling and is filtered and washed with cold (−78° C.) EtOH (300 mL) followed by hexanes (100 mL). The layers are separated and the aqueous fraction is washed with toluene (2×100 mL). The organics are combined and dried over $Na_2SO_4$ and filtered. The volatiles are removed under vacuum and the precipitate is dried and combined with the crystalline product 2 (total yield 25.7 g, 66%).

(c) Anion Generation n-Butyllithium (n-BuLi) (120 mL, 2.5 M, 1.6 mol) is added dropwise to a solution of product (b) (43.9 g, 188 mmol) in toluene (560 mL). A precipitate forms after an hour. The mixture is allowed to stand for 48 h and is filtered. The solid is washed with toluene (500 mL), then hexanes (500 mL), and is dried under vacuum (40.3 g, 90%).

(d) Preparation of Non-Bridged Complex

A 250-mL flask equipped with stir bar is charged with product (c) (10.0 g, 42.0 mmol) and toluene (95 mL) to make slurry. Diethyl ether (35 mL) is added slowly to afford a dark orange solution. This solution is added over the course of 15 minutes at room temperature to a slurry of $(C_5H_5)ZrCl_3$ (11.1 g, 42.0 mmol) in toluene (190 mL) and $Et_2O$ (190 mL) under vigorous stirring. The mixture turns deep red and is maintained at room temperature overnight. The slurry is filtered, and the red solid is collected and dried under vacuum (16.5 g, 78%).

COMPARATIVE EXAMPLE 5

Preparation of Silica-Supported Non-Bridged Indeno[1,2-b]indolyl Cp Complex

The procedure of Example 2 is repeated, but the non-bridged complex of Comparative Example 4 is used.

COMPARATIVE EXAMPLE 6

Two-Stage Ethylene Polymerization with Silica-Supported Non-bridged Indeno[1,2-b]indolyl Cp Complex The procedure of Example 3 is repeated, but the silica-supported non-bridged indeno[1,2-b]indolyl Cp complex of Comparative Example 5 is used. The polyethylene produced has a low Mw ($1.5 \times 10^5$) and narrow molecular weight distribution (Mw/Mn: 2.4). This indicates that the non-bridged complex does not give a broad molecular weight distribution.

We claim:

1. A dual process comprising two or more sequential stages:
    (1) polymerizing, in the presence of a bridged indenoindolyl ligand-containing group 4 transition metal complex and an activator, ethylene or a mixture of ethylene and a $C_3$ to $C_{10}$ α-olefin in a reactor in the presence of hydrogen at an ethylene/α-olefin weight ratio greater than 95/5 and a hydrogen/ethylene molar ratio within the range of about 0.001/1 to about 10/1 to produce a high density polyethylene (HDPE); and
    (2) continuing the polymerization, in the presence of the same complex and the same activator as in stage (1), by adding a mixture of ethylene and a $C_3$ to $C_{10}$ α-olefin to the reactor at an ethylene/α-olefin weight ratio less than 95/5 and a hydrogen/ethylene molar ratio less than 1/1 to produce a linear low density polyethylene (LLDPE).

2. The process of claim 1 wherein from about 30 to about 70 wt % of the product is produced in stage (1).

3. The process of claim 1 wherein the complex has the general structure:

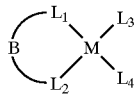

wherein M is a Group 4 transition metal; B is a bridging group; $L_1$ is an indenoindolyl ligand; $L_2$ is a ligand selected from the group consisting of cyclopentadienyls, indenyls, fluorenyls, boraarys, pyrrolyls, azaborolinyls, quinolinyls, indenoindolyls, and phosphinimines; $L_3$ and $L_4$, the same or different, are independently selected from the group consisting of hydrogen, halogens, alkyls, aryls, alkoxys, aryloxys, siloxys, alkyl aminos, and aryl aminos.

4. The process of claim 3 wherein M is selected from the group consisting of Zr and Ti.

5. The process of claim 3 wherein M is Zr.

6. The process of claim 3 wherein B is selected from the group consisting of $CR_2$, $C_2R_4$, $SiR_2$, $Si_2R_4$, $GeR_2$, $Ge_2R_4$, $R_2SiCR_2$, NR, and PR wherein the substituents R, the same or different from each other, are selected from the group consisting of hydrogen, alkyl, cycloalkyl, aryl, alkylaryl, and arylalkyl groups.

7. The process of claim 3 wherein B is selected from the group consisting of methylene, dimethylene, isopropylidene, and dimethylsilyl.

8. The process of claim 3 wherein $L_1$ is selected from the group consisting of

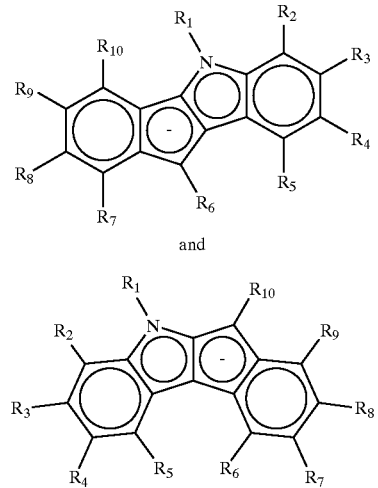

and wherein $R_1$ is selected from the group consisting of alkyl, aryl, aralkyl, and silyl groups; $R_2$ through $R_{10}$ are the same or different and selected from the group consisting of hydrogen, alkyl, aryl, aralkyl, alkylaryl, silyl, halogen, alkoxy, aryloxy, siloxy, nitro, dialkyl amino, and diaryl amino groups.

9. The process of claim 3 wherein $L_3$ and $L_4$, the same or different, are independently selected from halogens.

10. The process of claim 3 wherein both $L_3$ and $L_4$ are chlorine.

11. The process of claim 1 wherein the complex is selected from the group consisting of $Me_2Si(indeno[1,2-b]indolyl)(Cp)ZrCl_2$, $Me_2Si(indeno[1,2-b]indolyl)_2ZrCl_2$, $Me_2Si(indeno[2,1-b]indolyl)(Cp)ZrCl_2$, $Me_2Si(indeno[2,1-b]indolyl)_2ZrCl_2$, $Me_2C(indeno[1,2-b]indolyl)(Cp)ZrCl_2$, $Me_2C(indeno[1,2-b]indolyl)_2ZrCl_2$, $Me_2C(indeno[2,1-b]indolyl)(Cp)ZrCl_2$, $Me_2C(indeno[2,1-b]indolyl)_2ZrCl_2$, $Ph_2C(indeno[1,2-b]indolyl)(Cp)ZrCl_2$, $Ph_2C(indeno[2,1-b]indolyl)(Cp)ZrCl_2$, $Ph_2C(indeno[2,1-b]indolyl)_2ZrCl_2$, $Me_2Si(indeno[1,2-b]indolyl)(Flu)ZrCl_2$, $Me_2Si(indeno[2,1-b]indolyl)(Flu)ZrCl_2$, $Me_2C(indeno[1,2-b]indolyl)(Flu)ZrCl_2$, $Me_2C(indeno[2,1-b]indolyl)(Flu)ZrCl_2$, $Ph_2C(indeno[1,2-b]indolyl)(Flu)ZrCl_2$, $Ph_2C(indeno[2,1-b]indolyl)(Flu)ZrCl_2$, $(CH_2-CH_2)(indeno[1,2-b]indolyl)(Cp)ZrCl_2$, $(CH_2-CH_2)(indeno[1,2-b]indolyl)_2ZrCl_2$, $(CH_2-CH_2)(indeno[2,1-b]indolyl)(Cp)ZrCl_2$, $(CH_2-CH_2)(indeno[2,1-b]indolyl)_2ZrCl_2$, $((CH_3)_2Si-Si(CH_3)_2))(indeno[1,2-b]indolyl)(Cp)ZrCl_2$, $((CH_3)_2Si-Si(CH_3)_2))(indeno[1,2-b]indolyl)_2ZrCl_2$, $((CH_3)_2Si-Si(CH_3)_2))(indeno[2,1-b]indolyl)(Cp)ZrCl_2$, $((CH_3)_2Si-Si(CH_3)_2))(indeno[2,1-b]indolyl)_2ZrCl_2$, and mixtures thereof.

12. The process of claim 1 wherein the complex is supported.

13. The process of claim 1 wherein the activator is selected from the group consisting of alumoxanes, alkyl aluminums, alkyl aluminum halides, anionic compounds of boron or aluminum, trialkylboron and triarylboron compounds, and mixtures thereof.

14. The process of claim 1 wherein the activator is methylalumoxane (MAO) or polymeric MAO.

15. The process of claim 1 wherein the activator is tris-(pentafluorophenyl)borane.

16. The process of claim 1 wherein the α-olefin is selected from the group consisting of ethylene, propylene, 1-butene, 1-pentene, 1-hexene, 1-octene, 4-methyl-1-pentene, and mixtures thereof.

17. The process of claim 1 wherein the α-olefin is 1-hexene.

18. The process of claim 1 wherein the olefin is 1-butene.

19. A dual process comprising two or more sequential reactors:
(1) in a first reactor, polymerizing, in the presence of a bridged indenoindolyl ligand-containing group 4 transition metal complex and an activator, ethylene or a mixture of ethylene and a $C_3$ to $C_{10}$ α-olefin in the presence of hydrogen at an ethylene/α-olefin weight ratio greater than 95/5 and a hydrogen/ethylene molar ratio within the range of about 0.001/1 to about 10/1 to produce an HDPE; and
(2) transferring the product of (1) into a second reactor and continuing the polymerization in the presence of the same complex and the same activator as in stage (1) by adding a mixture of ethylene and a $C_3$ to $C_{10}$ α-olefin to the second reactor at an ethylene/α-olefin weight ratio less than 95/5 and a hydrogen/ethylene molar ratio less than 1/1 to produce an LLDPE.

20. The process of claim 19 wherein about 30 to about 70 wt % of the product is produced in the first reactor.

21. The process of claim 19 wherein the complex has the general structure:

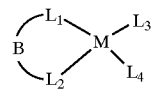

wherein M is a Group 4 transition metal; B is a bridging group; $L_1$ is an indenoindolyl ligand; $L_2$ is a ligand selected from the group consisting of cyclopentadienyls, indenyls, fluorenyls, boraarys, pyrrolyls, azaborolinyls, quinolinyls, indenoindolyls, and phosphinimines; $L_3$ and $L_4$, the same or different, are independently selected from the group consisting of hydrogen, halogens, alkyls, aryls, alkoxys, aryloxys, siloxys, alkyl aminos, and aryl aminos.

22. The process of claim 21 wherein M is selected from the group consisting of Zr and Ti.

23. The process of claim 21 wherein M is Zr.

24. The process of claim 21 wherein B is selected from the group consisting of $CR_2$, $C_2R_4$, $SiR_2$, $Si_2R_4$, $GeR_2$, $Ge_2R_4$, $R_2SiCR_2$, NR, and PR wherein the substituents R, the same or different from each other, are selected from the group consisting of hydrogen, alkyl, cycloalkyl, aryl, alkylaryl, and arylalkyl groups.

25. The process of claim 21 wherein B is selected from the group consisting of methylene, dimethylene, isopropylidene, and dimethylsilyl.

26. The process of claim 21 wherein $L_1$ is selected from the group consisting of

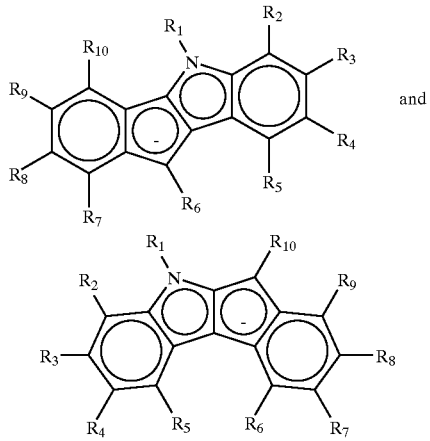

and wherein $R_1$ is selected from the group consisting of alkyl, aryl, aralkyl, and silyl groups; $R_2$ through $R_{10}$ are the same or different and selected from the group consisting of hydrogen, alkyl, aryl, aralkyl, alkylaryl, silyl, halogen, alkoxy, aryloxy, siloxy, nitro, dialkyl amino, and diaryl amino groups.

27. The process of claim 21 wherein $L_3$ and $L_4$, the same or different, are independently selected from halogens.

28. The process of claim 21 wherein both $L_3$ and $L_4$ are chlorine.

29. A dual process comprising two or more parallel reactors:
  (1) in a first reactor, polymerizing in the presence of a bridged indenoindolyl ligand-containing group 4 transition metal complex and an activator, ethylene or a mixture of ethylene and a $C_3$ to $C_{10}$ α-olefin in the presence of hydrogen at an ethylene/α-olefin weight ratio greater than 95/5 and hydrogen/ethylene molar ratio within the range of about 0.001/1 to about 10/1 to produce an HOPE; and
  (2) in a second reactor, polymerizing, in the presence of the same complex and the same activator as in stage (1), a mixture of ethylene and a $C_3$ to $C_{10}$ α-olefin to the second reactor at an ethylene/α-olefin weight ratio less than 95/5 and hydrogen/ethylene molar ratio less than 1/1 to produce an LLDPE; wherein the products from the reactors are mixed.

30. The process of claim 29 wherein about 30 to about 70 wt % of the product is produced in the first reactor.

31. The process of claim 29 wherein the complex has the general structure:

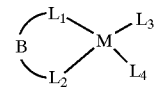

wherein M is a Group 4 transition metal; B is a bridging group; $L_1$ is an indenoindolyl ligand; $L_2$ is a ligand selected from the group consisting of cyclopentadienyls, indenyls, fluorenyls, boraarys, pyrrolyls, azaborolinyls, quinolinyls, indenoindolyls, and phosphinimines; $L_3$ and $L_4$, the same or different, are independently selected from the group consisting of hydrogen, halogens, alkyls, aryls, alkoxys, aryloxys, siloxys, alkyl aminos, and aryl aminos.

32. The process of claim 31 wherein M is selected from the group consisting of Zr and Ti.

33. The process of claim 31 wherein M is Zr.

34. The process of claim 31 wherein B is selected from the group consisting of $CR_2$, $C_2R_4$, $SiR_2$, $Si_2R_4$, $GeR_2$, $Ge_2R_4$, $R_2SiCR_2$, NR, and PR wherein the substituents R, the same or different from each other, are selected from the group consisting of hydrogen, alkyl, cycloalkyl, aryl, alkylaryl, and arylalkyl groups.

35. The process of claim 31 wherein B is selected from the group consisting of methylene, dimethylene, isopropylidene, and dimethylsilyl.

36. The process of claim 31 wherein $L_1$ is selected from the group consisting of

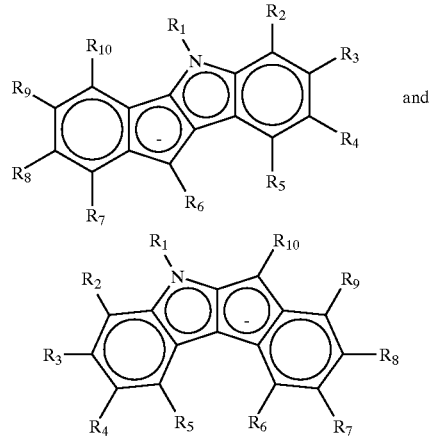

and wherein $R_1$ is selected from the group consisting of alkyl, aryl, aralkyl, and silyl groups; $R_2$ through $R_{10}$ are the same or different and selected from the group consisting of hydrogen, alkyl, aryl, aralkyl, alkylaryl, silyl, halogen, alkoxy, aryloxy, siloxy, nitro, dialkyl amino, and diaryl amino groups.

37. The process of claim 31 wherein $L_3$ and $L_4$, the same or different, are independently selected from halogens.

38. The process of claim 31 wherein both $L_3$ and $L_4$ are chlorine.

* * * * *